(12) United States Patent
Zhu et al.

(10) Patent No.: US 12,106,499 B2
(45) Date of Patent: Oct. 1, 2024

(54) IMAGE DEPTH ESTIMATION METHOD AND DEVICE, READABLE STORAGE MEDIUM AND ELECTRONIC EQUIPMENT

(71) Applicant: Beijing Horizon Information Technology Co., Ltd., Beijing (CN)

(72) Inventors: Hongmei Zhu, Beijing (CN); Qian Zhang, Beijing (CN); Wei Sui, Beijing (CN)

(73) Assignee: Beijing Horizon Information Technology Co., Ltd., Beijing (CN)

( * ) Notice: Subject to any disclaimer, the term of this patent is extended or adjusted under 35 U.S.C. 154(b) by 360 days.

(21) Appl. No.: 17/525,903

(22) Filed: Nov. 13, 2021

(65) Prior Publication Data
US 2022/0156957 A1      May 19, 2022

(30) Foreign Application Priority Data

Nov. 13, 2020   (CN) .......................... 202011267769.1

(51) Int. Cl.
*G06T 7/55*      (2017.01)
*G06T 7/70*      (2017.01)

(52) U.S. Cl.
CPC ................. *G06T 7/55* (2017.01); *G06T 7/70* (2017.01); *G06T 2207/20081* (2013.01); *G06T 2207/20084* (2013.01)

(58) Field of Classification Search
CPC ... G06T 7/55; G06T 7/70; G06T 2207/20081; G06T 2207/20084
See application file for complete search history.

(56) References Cited

U.S. PATENT DOCUMENTS

2020/0258249 A1    8/2020 Angelova et al.

FOREIGN PATENT DOCUMENTS

| CN | 108765481 A | 11/2018 |
| CN | 109087349 A | 12/2018 |
(Continued)

OTHER PUBLICATIONS

Di Cui et al, "Location and Map Reconstruction based on Monocular SLAM with CNN Learned Information", 2019, 3rd International Conference on Computer Engineering, Information Science & Application Technology (ICCIA 2019), pp. 308-312 (5 pages) (Year: 2019).*

(Continued)

*Primary Examiner* — David F Dunphy
(74) *Attorney, Agent, or Firm* — Harness, Dickey & Pierce, P.L.C.

(57) ABSTRACT

Disclosed are an image depth estimation method and device, a computer-readable storage medium and electronic equipment. The method includes: obtaining a first image frame and second image frame collected in a movement process of an electronic apparatus; determining a first feature map corresponding to the first image frame and a second feature map corresponding to the second image frame; determining a scaled inter-frame geometrical relationship between the first and second image frames; determining a reconstruction error between the first and second feature maps based on the inter-frame geometrical relationship; and determining a depth map corresponding to the first image frame based on the reconstruction error. According to embodiments of the disclosure, the reconstruction error between the first and second feature maps is determined by utilizing the inter-frame geometrical relationship, and explicit geometrical constraints are added for depth estimation, thereby improving the generalization of the depth estimation.

16 Claims, 8 Drawing Sheets

(56) References Cited

FOREIGN PATENT DOCUMENTS

| CN | 110610486 A | 12/2019 |
|---|---|---|
| CN | 111340867 A | 6/2020 |

OTHER PUBLICATIONS

Hailan Kuang et al, "Monocular SLAM Algorithm Based On Improved Depth Map Estimation And Keyframe Selection", 2018, 10th International Conference on Measuring Technology and Mechatronics Automation, pp. 350-353 (4 pages) (Year: 2018).*

Xin Yang et al, "Bayesian DeNet: Monocular Depth Prediction and Frame-Wise Fusion With Synchronized Uncertainty", 2019, IEEE Transactions on Multimedia, vol. 21, No. 11, pp. 2701-2713 (13 pages) (Year: 2019).*

Yalda Shankar, "Homography Estimation" [online]. Apr. 24, 2021 [retrieved on Apr. 24, 2024]. Retrieved from the Internet: <URL: https://towardsdatascience.com/estimating-a-homography-matrix-522c70ec4b2c> (13 pages) (Year: 2021).*

Search Report in corresponding Chinese Patent Application No. 202011267769.1 dated Nov. 14, 2023.

First Office Action in corresponding Chinese Patent Application No. 202011267769.1 dated Nov. 15, 2023.

* cited by examiner

IMAGE DEPTH ESTIMATION METHOD AND DEVICE, READABLE STORAGE MEDIUM AND ELECTRONIC EQUIPMENT

RELATED APPLICATION INFORMATION

This application claims priority to Chinese patent application No. CN202011267769.1 filed on Nov. 13, 2020, incorporated herein by reference.

TECHNICAL FIELD

The present disclosure relates to a depth estimation technology, and in particular to an image depth estimation method and device, a computer-readable storage medium and electronic equipment.

BACKGROUND

As a basic and important research branch in the field of computer version, monocular depth estimation has important application values in tasks such as intelligent robot navigation and obstacle avoidance, and autonomous driving intelligent perception. Existing monocular supervised depth estimation methods based on a deep neural network generally obtain depth maps from color images or gray-scale images directly through neural network regression. Explicit geometrical constraints are not added in the deep neural network, such that the generalization of the methods is relatively poor.

SUMMARY

To solve the technical problems, the present disclosure is proposed. Embodiments of the present disclosure provides an image depth estimation method and device, a computer-readable storage medium and electronic equipment.

According to an aspect of the embodiments of the present disclosure, there is provided a depth estimation method, including:

obtaining a first image frame and a second image frame collected in a movement process of an electronic apparatus;

determining a first feature map corresponding to the first image frame and a second feature map corresponding to the second image frame;

determining a scaled inter-frame geometrical relationship between the first image frame and the second image frame;

determining a reconstruction error between the first feature map and the second feature map based on the inter-frame geometrical relationship; and determining a depth map corresponding to the first image frame based on the reconstruction error.

According to another aspect of the embodiments of the present disclosure, there is provided a neural network training method, including:

determining a scaled inter-sample-frame geometrical relationship corresponding to a sample image pair in a training set, wherein the training set includes a plurality of sample image pairs, and each of the sample image pairs includes a first sample image and a second sample image, each of the first sample images corresponding to a true-value depth map;

processing the sample image pairs with a feature extraction branch, a pose estimation branch and a depth estimation branch in a first neural network so as to obtain a predicted inter-frame geometrical relationship and a predicted depth map corresponding to the first sample image;

determining first loss based on the predicted inter-frame geometrical relationship and the inter-sample-frame geometrical relationship, and determining second loss based on the predicted depth map and the true-value depth map; and training the first neural network based on the first loss and the second loss.

According to another aspect of the embodiments of the present disclosure, there is provided an image depth estimation device, including:

an image obtaining module which is configured to obtain a first image frame and a second image frame collected in a movement process of an electronic apparatus;

a feature extracting module which is configured to determine a first feature map corresponding to the first image frame obtained through the image obtaining module and a second feature map corresponding to the second image frame obtained through the image obtaining module;

a geometrical relationship determining module which is configured to determine an inter-frame geometrical relationship between the first image frame and the second image frame obtained through the image obtaining module;

an error reconstructing module which is configured to determine a reconstruction error between the first feature map and the second feature map based on the inter-frame geometrical relationship determined through the geometrical relationship determining module; and a depth estimating module which is configured to determine a depth map corresponding to the first image frame based on the reconstruction error determined through the error reconstructing module.

According to another aspect of the embodiments of the present disclosure, there is provided a neural network training device, including:

a supervisory information determining module which is configured to determine a scaled inter-sample-frame geometrical relationship corresponding to a sample image pair in a training set, wherein the training set includes a plurality of sample image pairs, and each of the sample image pairs includes a first sample image and a second sample image, each of the first sample images corresponding to a true-value depth map;

an information predicting module which is configured to process the sample image pairs with a feature extraction branch, a pose estimation branch and a depth estimation branch in a first neural network so as to obtain a predicted inter-frame geometrical relationship and a predicted depth map corresponding to the first sample image;

a loss determining module which is configured to determine first loss based on the predicted inter-frame geometrical relationship determined through the information predicting module and the inter-sample-frame geometrical relationship determined through the supervisory information determining module, and determine second loss based on the predicted depth map determined through the information predicating module and the true-value depth map; and a network training module which is configured to train the first neural network based on the first loss and the second loss determined through the loss determining module.

According to another aspect of the embodiments of the present disclosure, there is provided a computer-readable storage medium on which a computer program is stored, wherein the computer program is configured to execute the image depth estimation method in any embodiment or the neural network training method in any embodiment.

According to another aspect of the embodiments of the present disclosure, there is provided electronic equipment, including:

a processor, and a memory which is configured to store executable instructions of the processor, the processor being configured to read the executable instructions from the memory and execute the instructions to implement the image depth estimation method in any embodiment or the neural network training method in any embodiment.

Based on the image depth estimation method and device, the computer-readable storage medium and the electronic equipment provided in the embodiments of the present disclosure, a reconstruction error between a first feature map and a second feature map is determined by utilizing an inter-frame geometrical relationship, and explicit geometrical constraints are added for depth estimation, such that the generalization of the depth estimation is improved.

The technical solution of the disclosure will be described in detail through the drawings and embodiments hereinafter.

BRIEF DESCRIPTION OF DRAWINGS

Through a more detailed description of embodiments of the present disclosure in conjunction with the accompanying drawings, the above and other objectives, features, and advantages of the disclosure will become more apparent. The accompanying drawings are used to provide a further understanding of the embodiments of the present disclosure, constitute a part of the specification, explain the present disclosure together with the embodiments of the present disclosure, and do not constitute a limitation to the present disclosure. In the drawings, the same reference numerals generally represent the same components or steps.

DETAILED DESCRIPTION OF THE EMBODIMENTS

Figure 1:
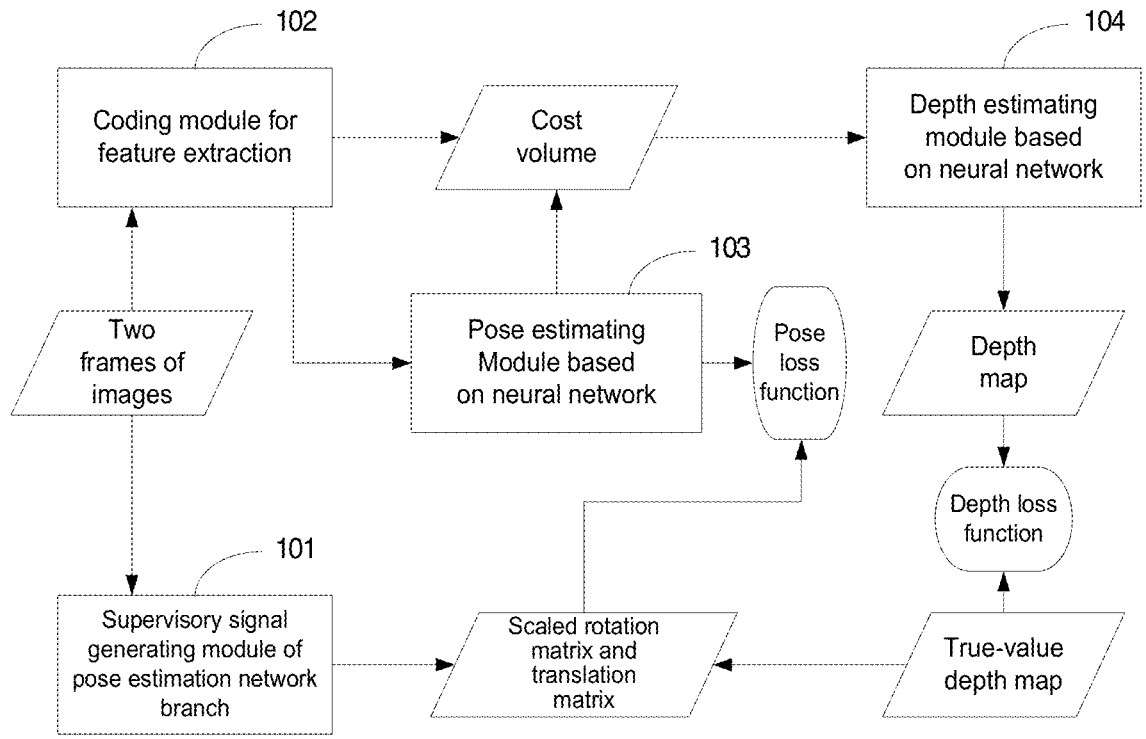
FIG. 1 is a schematic diagram of a neural network training structure in an image depth estimation method provided in an exemplary embodiment of the present disclosure.

Exemplary embodiments according to the present disclosure will be described below in detail with reference to the accompanying drawings. Apparently, the described embodiments are merely part of embodiments of the present disclosure, not all of embodiments of the present disclosure. It should be understood that the present disclosure is not limited by the exemplary embodiments described here.

It should be noted that unless specifically stated otherwise, the relative arrangement, numerical expressions and numerical values of components and steps stated in the embodiments do not limit the scope of the present disclosure.

Those skilled in the art can understand that terms such as "first" and "second" in the embodiments of the present disclosure are only used to distinguish different steps, equipment or modules, and neither represent any specific technical meaning nor necessarily logical order between them.

It should also be understood that in the embodiments of the present disclosure, "a plurality of" may mean two or more, and "at least one" may mean one or two or more.

It should also be understood that any component, data or structure mentioned in the embodiments of the present disclosure can generally be understood as one or more, without explicit limitation or contrary revelations given in the context.

In addition, the term "and/or" in the present disclosure is only an association that describes an associated object, indicating that three relations can exist. For example, A and/or B may indicate that: A exists alone, A and B exist simultaneously, and B exists alone. In addition, the character "/" in the present disclosure generally indicates that the relationship "or" exists between the associated objects.

It should also be understood that the description of each embodiment in the present disclosure emphasizes the differences between each embodiment, and the same or similar parts can be referred to each other. For the sake of simplicity, no repetition will be given.

Meanwhile, it should be understood that for convenience of description, the sizes of various parts shown in the drawings are not drawn in accordance with actual proportional relationships.

The following description of at least one exemplary embodiment is actually only illustrative, and shall not be intended to limit the disclosure and its application or use.

The technologies, methods and devices known to those ordinary skilled in the relevant arts may not be discussed in detail, but the technologies, methods and devices should be regarded as part of the description as appropriate.

It should be noted that similar reference signs and letters indicate similar items in the following drawings. Therefore, a certain item will not be further discussed in the subsequent drawings once defined in one drawing.

The embodiments of the present disclosure may be applied to electronic equipment such as terminal equipment, computer systems and servers, which may operate with many other general-purpose or special-purpose computing system environments or configurations. Examples of well-known terminal equipment, computing systems, environments and/or configurations suitable for use with the electronic equipment such as the terminal equipment, the computer systems and the servers include, but are not limited to: personal computer systems, server computer systems, thin clients, thick clients, hand-held or laptop devices, microprocessor-based systems, set-top boxes, programmable consumer electronics, networked personal computers, small computer systems, large computer systems, and distributed cloud computing technology environments including any of the above systems, etc.

The electronic equipment such as the terminal equipment, the computer systems, and the servers may be described in the general context of computer system executable instructions (such as program modules) executed by the computer systems. Generally, the program modules may include routines, programs, object programs, components, logic, data structures, etc., which perform specific tasks or implement specific abstract data types. The computer systems/servers may be implemented in a distributed cloud computing environment. In the distributed cloud computing environment, tasks are executed by remote processing equipment linked through a communication network. In the distributed cloud computing environment, the program modules may be located on a storage medium of a local or remote computing system including storage equipment.

Application Overview

In a process of implementing the disclosure, the inventors find that existing monocular supervised depth estimation methods based on the deep neural network generally obtain depth maps from color images or gray-scale images directly through neural network regression, but the generalization of depth estimation is poor.

Exemplary System

In an image depth estimation method proposed in an embodiment of the present disclosure, the input is two consecutive frames of images collected during the movement process of mobile equipment (for example, a webcam, a camera, etc.), and a network structure of the neural network includes a pose estimation network branch and a depth estimation network branch. The pose estimation network branch and the depth estimation network branch share a coding network for feature extraction. A reconstruction error between deep feature maps corresponding to the two frames of images is calculated based on an inter-frame geometrical relationship output from the pose estimation network branch, explicit geometrical constraints are added for the depth estimation network branch, and a depth map is finally obtained through decoding network regression of the depth estimation network branch. The key point of the image depth estimation method is that in case of not utilizing other motion sensing apparatuses, the pose estimation network outputs a scaled inter-frame geometrical relationship (the inter-frame geometrical relationship is configured to show a moving distance and an angle change of the mobile equipment, including a translation distance and a rotation matrix, wherein the scale refers to a proportion, and 'scaled' is compared with the case that an inter-frame geometrical relationship obtained by a method in a related art is scale-free. That is, the inter-frame geometrical relationship given in the related art has a constant-multiple proportional relationship not equal to 1 between the translation distance and a true translation distance, and cannot provide a true translation distance of the mobile equipment, while the scaled inter-frame geometrical relationship provides a true moving distance and a true rotation matrix of the mobile equipment). In the embodiment of the present disclosure, when the neural network used for depth estimation is trained, a traditional visual odometer method (which is a method for calculating the inter-frame geometrical relationship in the related art, may be summarized to extract a key point from each image, calculate a matching relationship between the two frames of images and determine a rotation matrix and a translation distance of the camera) is utilized to calculate a scale-free inter-frame geometrical relationship. Different scale factors are discretely assumed and combined with a true-value depth map (that may be obtained through a depth camera or other equipment) to restore scale information of the inter-frame geometrical relationship (one scale factor is determined as the scale information from the plurality of the assumed scale factors); the scaled inter-frame geometrical relationship (that may be obtained by multiplying the scale factor with the scale-free inter-frame geometrical relationship) is taken as a supervisory signal of the pose estimation network branch to train the pose estimation network branch in a supervisory manner, such that a scaled inter-frame geometrical relationship may be output in case of only inputting two frames of images. In addition, the inter-frame geometrical relationship output from the pose estimation network branch may participate in depth estimation calculation both in a training process and a test process, and explicit geometrical constraints are added for monocular depth estimation, such that the generalization of the image depth estimation method is improved.

FIG. 1 is a schematic diagram of a neural network training structure in an image depth estimation method provided in an exemplary embodiment of the present disclosure. The structure in the training process of a neural network mainly includes four parts: a supervisory signal generating module 101 of a pose estimation network branch, a coding module 102 for feature extraction, a pose estimating module 103 based on the neural network and a depth estimating module 104 based on the neural network, related calculation of a visual odometer is only implemented in a model training stage, and the steps in a dotted box in FIG. 1 are only executed in test. As shown in FIG. 1, the neural network training process includes the following operations.

The supervisory signal generating module 101 of the pose estimation network branch specifically may implement the following four steps:

1.1) estimating a scale-free rotation matrix R and a scale-free translation distance t of two frames of images (a target image and a reference image) through a traditional visual odometer method.

1.2) discretely assuming different scale factors (namely, discrete multiple scale factors, for example, 1, 1.5, 2, 2.5 and the like), and calculating an overall reconstruction error $R_{err}$ from the reference image to the target image in combination with a true-value depth map (the true-value depth map of the target image) based on the following formula (1):

$$R_{err} = |I_r(p_t) - I_s(p_s)| \qquad \text{Formula (1)}$$

where $p_t$ and $p_s$ are respectively pixel pairs, meeting a corresponding relationship as shown in formula (2), in the target image $I_t$ and the reference image $I_s$:

$$p_s : K T_{t \to s} D_t^{GT} K^{-1} p_t \qquad \text{Formula (2)}$$

where K is an internal parameter of a camera (mobile equipment), $D_t^{GT}$ is a true-value depth value at a pixel $p_t$, $T_{t \to s}$ is a transformation matrix between the two frames of images, and the transformation matrix is defined as the following formula (3):

$$T_{t \to s} = \begin{bmatrix} R & ct \\ 0^T & 1 \end{bmatrix}, c = \Delta c, 2\Delta c, \ldots, N_1 \Delta c \qquad \text{Formula (3)}$$

Where c is a discrete assumed scale factor, Δc is a scale interval self-defined by a user based on precision needs, and $N_1$ is a total number of values of c.

1.3) recording a scale factor corresponding to the minimum overall reconstruction error as scale information of a translation vector output from a visual odometer, and multiplying the scale factor with the scale-free rotation matrix and the scale-free translation distance obtained in step 1.1) to obtain a scaled rotation matrix and a scaled translation distance.

1.4) outputting the scaled rotation matrix R' and the scaled translation distance t' as a supervisory signal for training the pose estimation branch of the neural network.

The scaled inter-frame geometrical relationship is restored through the scale-free inter-frame geometrical relationship output from the visual odometer and a true-value depth map so as to calculate a reconstruction error of an inter-frame deep feature map in a depth estimation network, and explicit geometrical constraints are added in the depth estimation network, such that the generalization of the image depth estimation method is better.

A training process for the neural network in conjunction with the supervisory signal may include the following steps:

2.1) respectively inputting the target image and the reference image into the coding module 102 for feature extraction, and outputting two feature maps (a target feature map of the target image and a reference map of the reference image).

2.2) utilizing the pose estimating module 103 based on the neural network to predict poses of the two feature maps, such that a predicted rotation matrix R" and a predicted translation distance t" of the mobile equipment may be obtained in a process of collection of the reference image to collection of the target image.

2.3) determining first loss of the pose estimation branch based on the predicted rotation matrix (an Euler angle of $e_{R''}$ which represents an Euler angle of the rotation matrix R") and the predicted translation distance as well as the scaled rotation matrix R' and the scaled translation distance t' output in step 1.4), wherein the first loss $L_{pose}$ in the present embodiment may be determined based on the following formula (4):

$$L_{pose} = |t'' - t'| + \lambda_1 |e_{R''} - e_{R'}| \qquad \text{Formula (4)}$$

where $e_{R'}$ represents an Euler angle of the rotation matrix R' and $\lambda_1$ is a balance constant factor (valued according to a practical condition).

2.4) generating a reconstruction error from the reference feature map to the target feature map and then generating a cost volume, by keeping the predicted rotation matrix and the predicted translation distance output from the pose estimating module 103 based on the neural network unchanged and discretely assuming different depth values, wherein the cost volume is generated based on the following formula (5):

$$F_{err} = |F_t(p_t) - F_s(p_s)| \qquad \text{Formula (5)}$$

where $p_t$ and $p_s$ are respectively feature point pairs, meeting a corresponding relationship as shown in formula (6), in the target feature map $F_t$ and the reference feature map $F_s$:

$$p_s : K T^*_{t \to s} d_t K^{-1} p_t, \; d_t = \Delta d, 2\Delta d, \ldots, N_2 \Delta d \qquad \text{Formula (6)}$$

where K is an internal parameter, corresponding to a feature resolution, of the camera, $T^*_{t \to s}$ is a scaled transformation matrix between two frames output from the pose estimation branch, $d_t$ is an assumed depth value at a pixel $p_t$, Δd is a depth value interval self-defined by the user based on the precision needs, and $N_2$ is a total number of values of the $d_t$. The values of the $d_t$ may be traversed to obtain an error vector formed by the $F_{err}$ and a four-dimensional matrix formed by error vectors of all feature points is taken as a cost volume.

2.5) inputting the cost volume into the depth estimating module 104 based on the neural network to obtain a predicted depth map corresponding to the target image.

2.6) determining second loss $L_{depth}$ based on difference between the predicted depth map $D_p$ and a true-value depth map $D_p^{GT}$, wherein the second loss may be determined based on the following formula (7):

$$L_{depth} = \sum_{p \in \Omega} |D_p - D_p^{GT}| \qquad \text{Formula (7)}$$

where Ω is a pixel set with true-value depth.

2.7) combing the first loss and the second loss to determine comprehensive loss (that may be determined through a weighting summation method, where weights are hyper-parameters and are capable of being predetermined); calculating a gradient of the neural network based on the comprehensive loss, and performing back propagation, so as to update weights (namely network parameters) in the neural network, wherein optionally, the comprehensive loss $L_{total}$ may be determined based on the following formula (8):

$$L_{total} = L_{depth} + \lambda_2 L_{pose} \qquad \text{Formula (8)}$$

where $\lambda_2$ represents a balance constant factor (valued according to a practical condition).

2.8) repeating steps 2.1) to 2.7) until the neural network is converged. Optionally, conditions of convergence may be that a change of the comprehensive loss trained twice is smaller than a first set value or the comprehensive loss is smaller than a second set value or reaches a set number of iterations, which are not limited in the present embodiment.

In case of only containing a RGBD video sequence in the training set in the embodiment of the present disclosure, the scale factor of the visual odometer is discretely assumed, and is combined with the true-value depth map to calculate scaled pose information as a true value based on the pose estimation method for the deep neural network. Supervised training on the pose estimation network and the depth estimation network is simultaneously performed to obtain the scaled motion information. In such a manner, precise positioning of the mobile equipment is facilitated, and the problem that geometrical constraint scale in depth estimation is uncertain is solved, such that the generalization of the depth estimation method is better.

Figure 2:
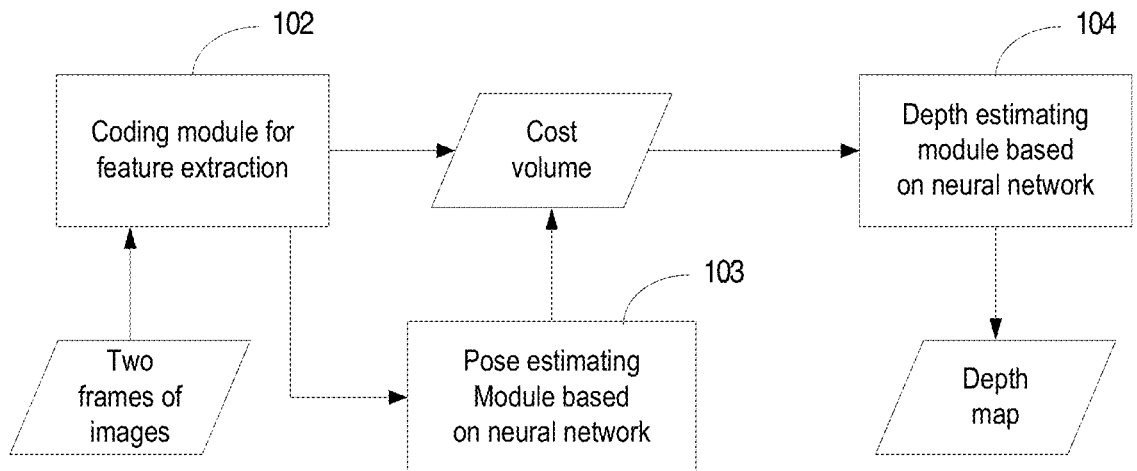
FIG. 2 is a structural schematic diagram of an image depth estimation method for depth estimation provided in an exemplary embodiment of the present disclosure.

FIG. 2 is a structural schematic diagram of an image depth estimation method for depth estimation provided in an exemplary embodiment of the present disclosure. As shown in FIG. 2, the neural network (including the coding module 102 for feature extraction, the pose estimating module 103 and the depth estimating module 104) trained in FIG. 1 is utilized to perform depth estimation on the two consecutive frames of images collected in the movement process of the mobile equipment to obtain a depth map corresponding to one frame of images.

The two consecutive frames of images (a first image frame and a second image frame) collected in the movement process of the mobile equipment are input into the trained neural network, and the feature extraction is performed through the coding module 102 for feature extraction of the neural network to obtain a first feature map and a second feature map corresponding to the two frames of images.

The pose estimating module 103 performs pose prediction on the first feature map and the second feature map to obtain a scaled rotation matrix and a scaled translation distance.

Based on the scaled rotation matrix and the scaled translation distance, different depth values are discretely assumed to obtain a reconstruction error from the second feature map to the first feature map, such that a cost volume is obtained.

The cost volume is input into the depth estimating module 104 to obtain a predicated depth map corresponding to the first image frame.

Exemplary Method

Figure 3:
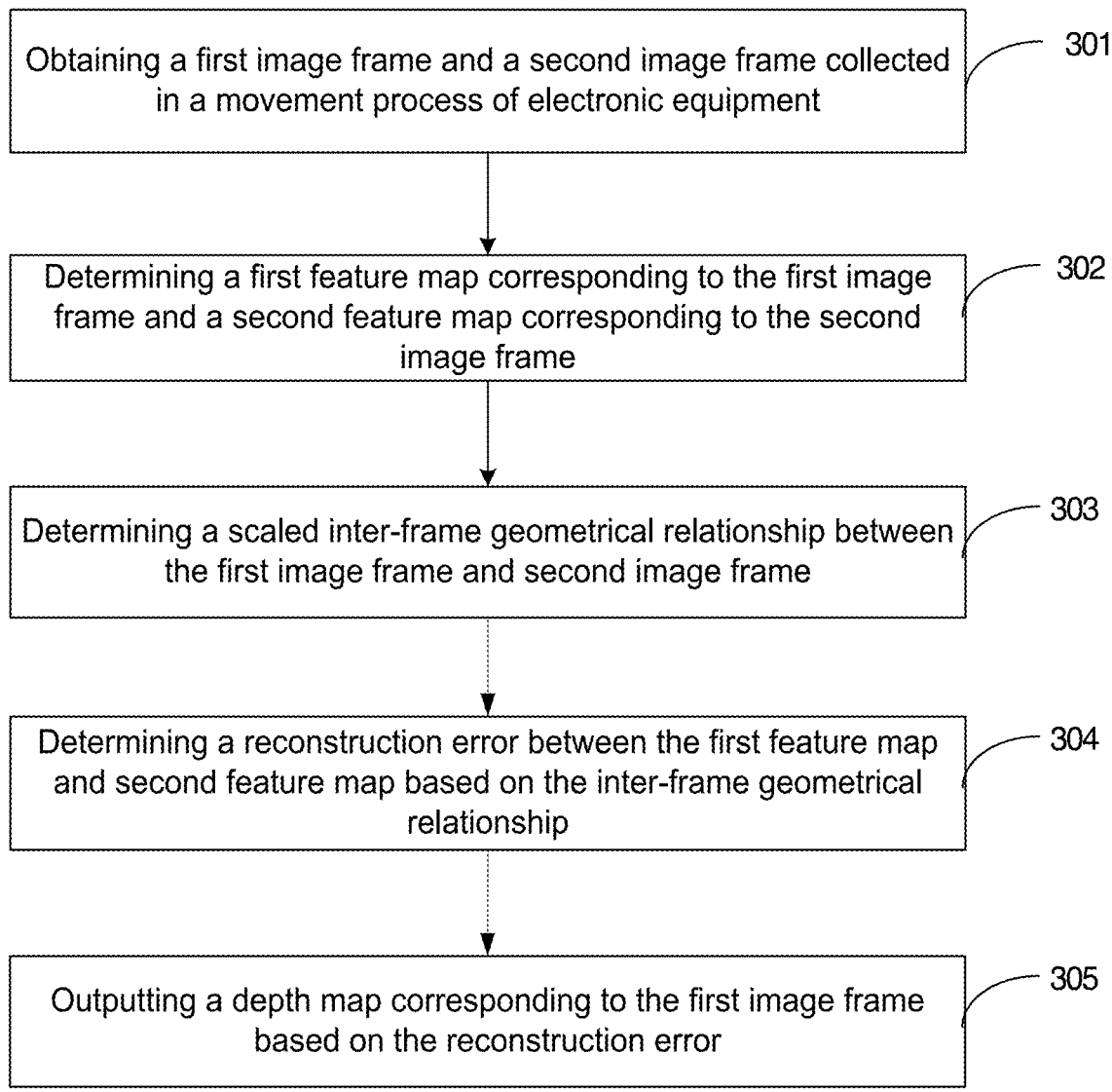
FIG. 3 is a flow diagram of an image depth estimation method provided in an exemplary embodiment of the present disclosure.

FIG. 3 is a flow diagram showing a process of an image depth estimation method provided in an exemplary embodiment of the present disclosure. The present embodiment may be applied to an electronic apparatus, and as shown in FIG. 3, it includes the following steps.

In step 301, a first image frame and a second image frame collected in a movement process of an electronic apparatus are obtained.

The first image frame and the second image frame are two consecutive frames of images collected through the electronic apparatus which may be a webcam, a camera and the like.

In step 302, a first feature map corresponding to the first image frame and a second feature map corresponding to the second image frame are determined.

In an embodiment, feature extraction is respectively performed on the first image frame and the second image frame to obtain a first feature map and a second feature map. For example, a coding network 102 for feature extraction in the neural network trained in FIG. 1 may be utilized to realize feature extraction.

In step 303, a scaled inter-frame geometrical relationship between the first image frame and second image frame is determined.

The inter-frame geometrical relationship includes a rotation matrix and a translation distance that electronic apparatus moves in a process of collection of the first image frame to collection of the second image frame. The scaled means that the distance and the rotation matrix that the electronic apparatus practically moves is expressed by the inter-frame geometrical relationship, and is compared with a scale-free inter-frame geometrical relationship obtained in the related art.

In step 304, a reconstruction error between the first feature map and the second feature map is determined based on the inter-frame geometrical relationship.

Optionally, the reconstruction error may be determined based on feature point pairs, meeting conditions of formula (6) in the embodiment as shown in FIG. 1, in the first feature map and the second feature map. For example, the reconstruction error from the second feature map to the first feature map is obtained as shown in formula (5).

In step 305, a depth map corresponding to the first image frame is determined based on the reconstruction error.

Optionally, the reconstruction error may be input into the depth estimating module 104 in the embodiment as shown in FIG. 2, and a depth map corresponding to the first image frame is predicted through the branch network.

According to the image depth estimation method provided in the above embodiment of the present disclosure, the reconstruction error between the first feature map and the second feature map is determined by utilizing the inter-frame geometrical relationship, and explicit geometrical constraints are added for depth estimation, such that the generalization of depth estimation is improved.

Figure 4:
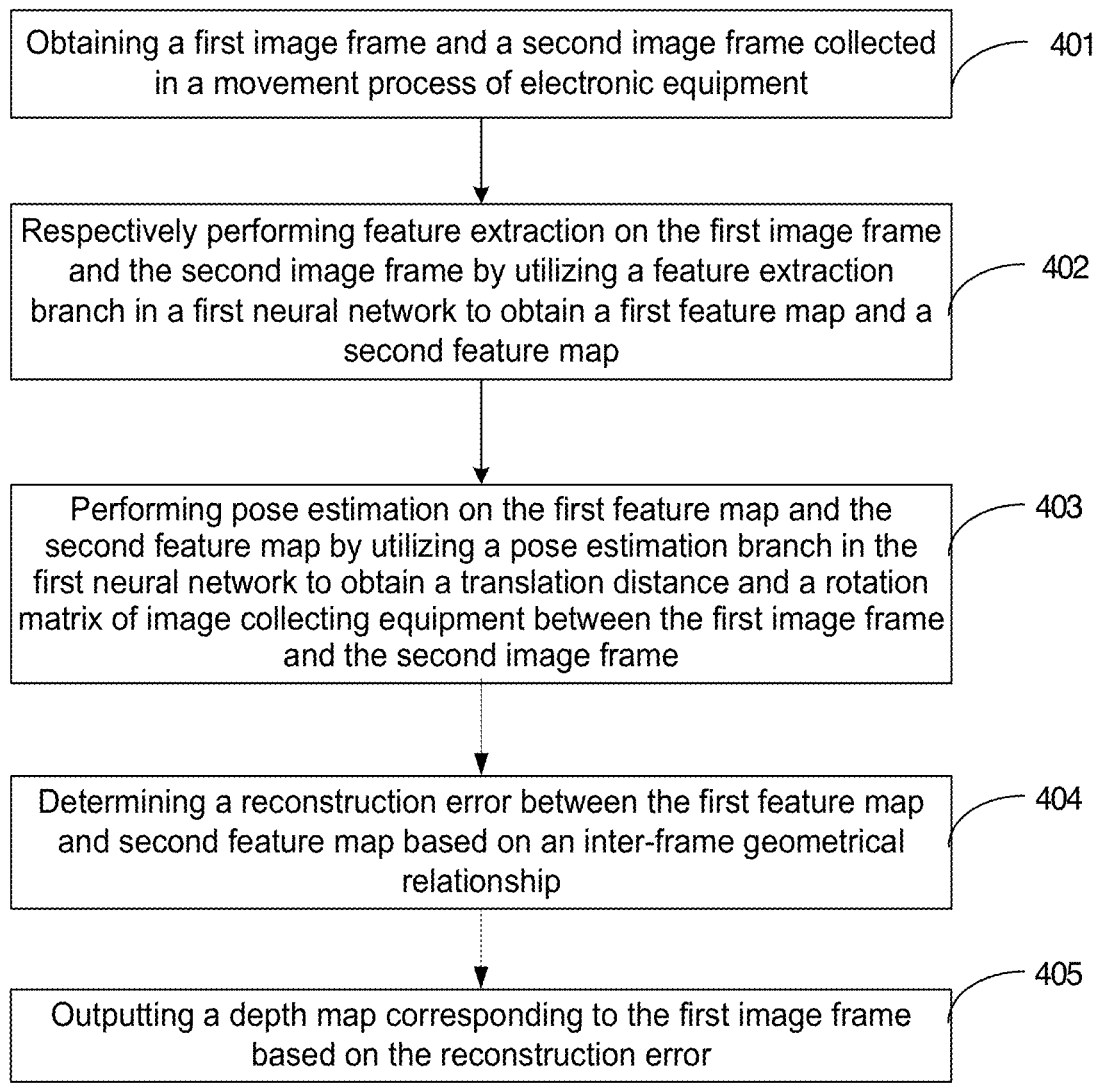
FIG. 4 is a flow diagram of an image depth estimation method provided in another exemplary embodiment of the disclosure.

FIG. 4 is a flow diagram showing an image depth estimation method provided in another exemplary embodiment of the present disclosure. As shown in FIG. 4, following steps are included.

In step 401, a first image frame and a second image frame collected in a movement process of an electronic apparatus are obtained.

The implementation process and the implementation effect of this step are similar with those of step 301 in the embodiment as shown in FIG. 3, which are not further described here.

In step 402, feature extraction is respectively performed on the first image frame and the second image frame by utilizing a feature extraction branch in a first neural network to obtain a first feature map and a second feature map.

Optionally, the structure of the first neural network in the present embodiment may refer to the network structure in the embodiment as shown in FIG. 2, and the feature extraction branch corresponds to the coding module 102 for feature extraction in FIG. 2.

In step 403, a pose estimation branch in the first neural network is utilized to perform pose estimation on the first feature map and the second feature map to obtain a translation distance and a rotation matrix of image collecting equipment between the first image frame and the second image frame.

Optionally, the pose estimation branch in the present embodiment may correspond to the pose estimating module 103 in the embodiment as shown in FIG. 2, and pose prediction is performed on the first feature map and the second feature map through the pose estimation branch to obtain a translation distance and a rotation matrix of the electronic apparatus in a process of collection of the first image frame to collection of the second image frame.

In step 404, a reconstruction error between the first feature map and the second feature map is determined based on the inter-frame geometrical relationship.

The implementation process and the implementation effect of this step are similar with those of step 304 in the embodiment as shown in FIG. 3, which are not further described here.

In step 405, a depth map corresponding to the first image frame is determined based on the reconstruction error.

The implementation process and the implementation effect of this step are similar with those of step 305 in the embodiment as shown in FIG. 3, which are not further described here.

In the embodiment, the inter-frame geometrical relationship includes the translation distance and the rotation matrix. The feature extraction and the pose estimation are realized through the first neural network which may be trained through the process provided in the embodiment as shown in FIG. 1; in the training process, the scaled inter-frame geometrical relationship is restored through the scale-free inter-frame geometrical relationship output from the visual odometer and the true-value depth map so as to calculate a reconstruction error of the inter-frame deep feature map in the depth estimating module 104, and explicit geometrical constraints are added in the depth estimating module 104, such that the generalization of the image depth estimation method in the embodiment is better.

Figure 5:
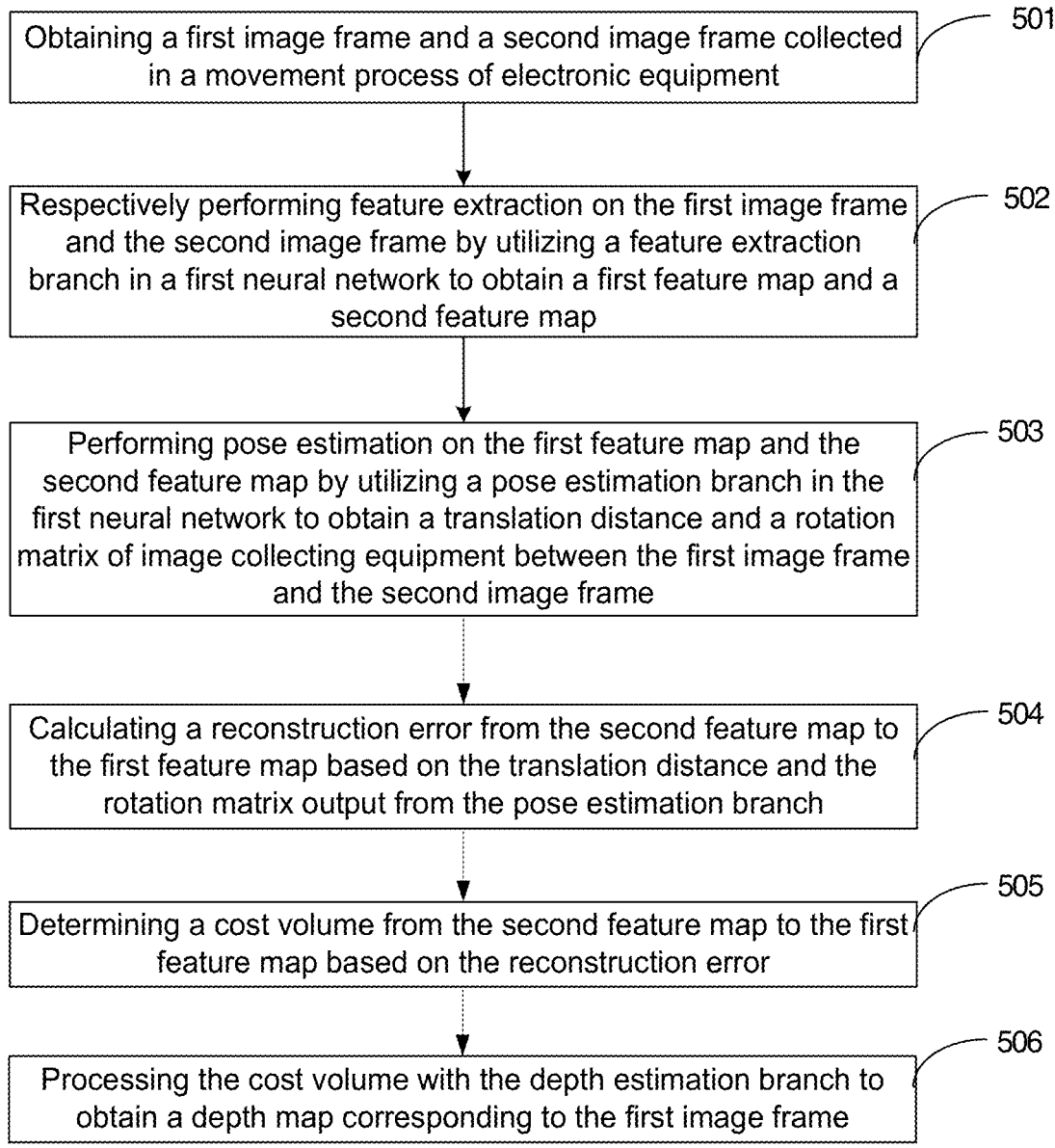
FIG. 5 is a flow diagram of an image depth estimation method provided in another exemplary embodiment of the present disclosure.

FIG. 5 is a flow diagram showing an image depth estimation method provided in another exemplary embodiment of the present disclosure. As shown in FIG. 5, following steps are included.

In step 501, a first image frame and a second image frame collected in a movement process of an electronic apparatus are obtained.

The implementation process and the implementation effect of this step are similar with those of step 301 in the embodiment as shown in FIG. 3, which are not further described here.

In step 502, feature extraction is respectively performed on the first image frame and the second image frame by utilizing a feature extraction branch in a first neural network to obtain a first feature map and a second feature map.

The implementation process and the implementation effect of this step are similar with those of step 402 in the embodiment as shown in FIG. 4, which are not further described here.

In step 503, a pose estimation branch in the first neural network is utilized to perform pose estimation on the first feature map and the second feature map to obtain a translation distance and a rotation matrix of image collecting equipment between the first image frame and the second image frame.

The implementation process and the implementation effect of this step are similar with those of step 403 in the embodiment as shown in FIG. 4, which are not further described here.

In step 504, a reconstruction error from the second feature map to the first feature map is calculated based on the translation distance and the rotation matrix output from the pose estimation branch.

Optionally, the reconstruction error from the second feature map to the first feature map may be obtained based on the formula (5) in the embodiment as shown in FIG. 1.

Optionally, a plurality of groups of pixel pairs, meeting set conditions, in the first feature map and the second feature map are determined based on the translation distance, the rotation matrix and a plurality of preset depth values. Each group of the pixel pairs includes a first feature point in the first feature map and a plurality of second feature points in the second feature map. A reconstruction error between one first feature point and one second feature point in each group of the pixel pairs is determined.

To determine the reconstruction error in the present embodiment, pixel pairs with a corresponding relationship are firstly determined, all pixel pairs corresponding to a depth value in the first feature map and the second feature map are substituted into formula (5) in case of assuming the depth value, such that the reconstruction error from the second feature map to the first feature map may be obtained under the depth value.

In step 505, a cost volume from the second feature map to the first feature map is determined based on the reconstruction error.

Optionally, the reconstruction error corresponding to the depth value may be obtained based on formula (5) when the depth value is unique; due to the uncertain depth value in the present embodiment, $p_t$ and $p_s$ in formula (5) are respectively feature point pairs, meeting the corresponding relationship as shown in formula (6), in the first feature map and the second feature map by discretely assuming a plurality of different depth values; the values of $d_t$ may be traversed to obtain an error vector formed by $F_{err}$. The error vectors of all feature points form a cost volume with a four-dimensional matrix form. Optionally, the error vector corresponding to each pixel pair is determined based on the reconstruction error between one first feature point and one second feature point in each group of pixel pairs. A cost volume from the second feature map to the first feature map is determined based on the error vectors corresponding to the plurality of groups of the pixel pairs.

In step 506, the cost volume is processed with a depth estimation branch to obtain a depth map corresponding to the first image frame.

Scaled motion information is obtained through the pose estimation branch in the present embodiment. In such a manner, precise positioning of the electronic apparatus is facilitated, and the problem that geometrical constraint scale in depth estimation is uncertain is solved, such that the generalization of the depth estimation method is better.

Figure 6:
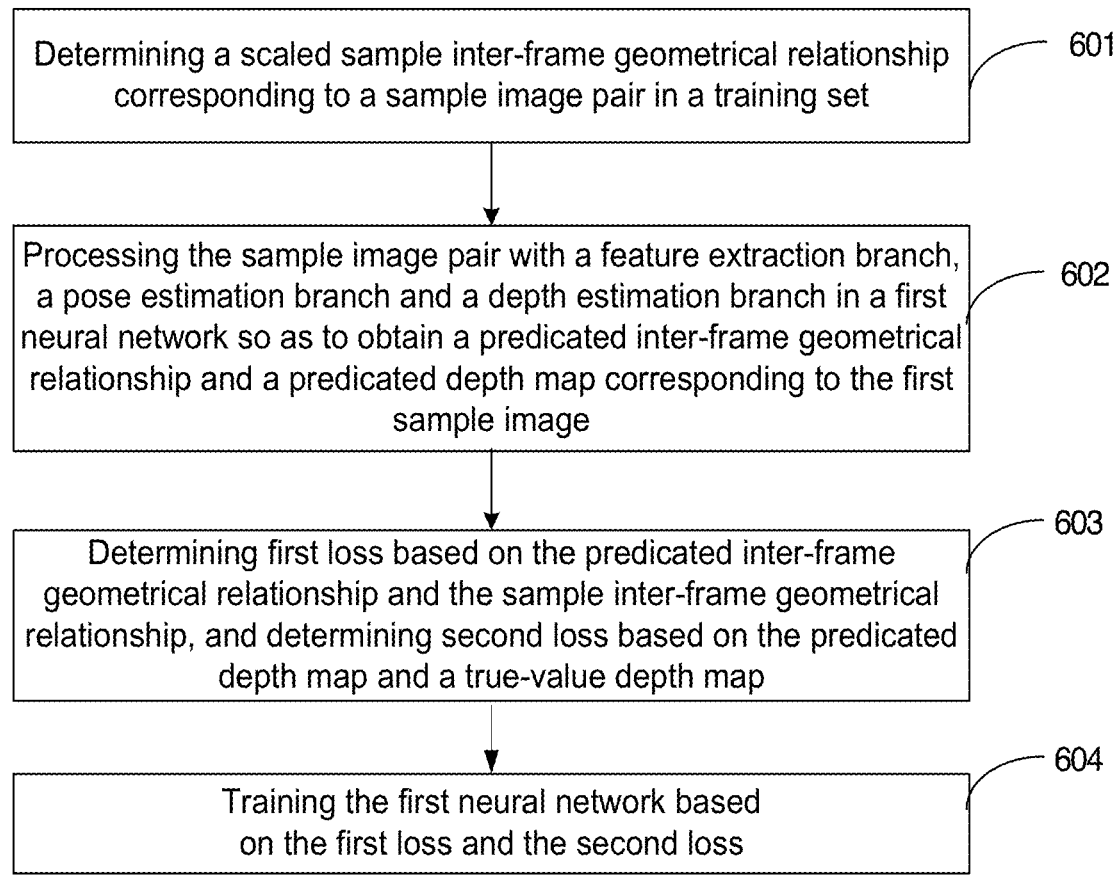
FIG. 6 is a flow diagram of a neural network training method provided in an exemplary embodiment of the present disclosure.

FIG. 6 is a flow diagram showing a neural network training method provided in an exemplary embodiment of the present disclosure. As shown in FIG. 6, following steps are included.

In step 601, a scaled inter-sample-frame geometrical relationship corresponding to a sample image pair in a training set is determined.

The training set includes a plurality of sample image pairs, and each of the sample image pairs includes a first sample image and a second sample image, each of the first sample images corresponding to a true-value depth map.

Optionally, the true-value depth map may be obtained through equipment such as a depth camera. The process of obtaining the scaled inter-sample-frame geometrical relationship in this step may refer to four specifically implemented steps of the supervisory signal generating module 101 of the pose estimation network branch in the embodiment as shown in FIG.

In step 602, the sample image pair is processed with a feature extraction branch, a pose estimation branch and a depth estimation branch in a first neural network so as to obtain a predicted inter-frame geometrical relationship and a predicted depth map corresponding to the first sample image.

Prediction on the inter-frame geometrical relationship and prediction on the depth map, that are realized in the step, may refer to steps 2.1), 2.2), 2.4) and 2.5) in the embodiment as shown in FIG. 1, such that prediction on the inter-frame geometrical relationship of the sample image pair and prediction on the depth map through the first neural network is realized.

In step 603, first loss is determined based on the predicted inter-frame geometrical relationship and the inter-sample-frame geometrical relationship, and second loss is determined based on the predicted depth map and the true-value depth map.

The first loss may be determined with reference to formula (4) and the second loss may be determined with reference to formula (7).

In step 604, the first neural network is trained based on the first loss and the second loss.

According to the neural network training method provided in the embodiment of the present disclosure, comprehensive loss is firstly determined based on the first loss and the second loss by referring to formula (8), a gradient of the first neural network is determined based on the comprehensive loss, and network parameters in the first neural network are updated through gradient back propagation, such that training of the first neural network is realized. In the present embodiment, the scaled inter-sample-frame geometrical relationship is added as the supervisory signal to simultaneously realize supervised training on the pose estimation network and the depth estimation network, such that the scaled motion information is obtained, and the precise positioning of mobile equipment is facilitated. And meanwhile, the problem that geometrical constraint scale is uncertain in depth estimation is solved, such that the generalization of the trained first neural network is better.

Figure 7:
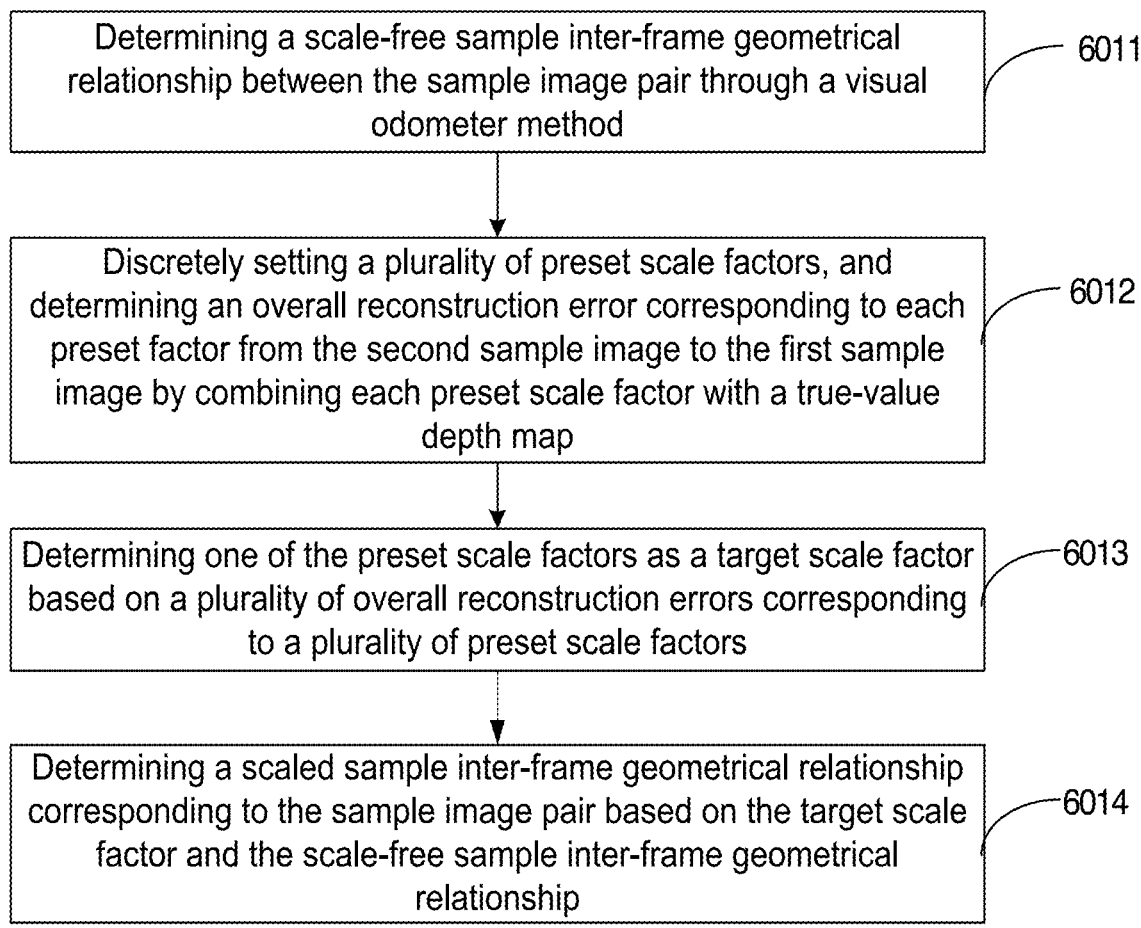
FIG. 7 is a flow diagram of step 601 in the embodiment shown in FIG. 6 of the present disclosure.

As shown in FIG. 7, based on the embodiment as shown in FIG. 6, step 601 may include the following steps.

In step 6011, a scale-free inter-sample-frame geometrical relationship between a sample image pair is determined through a visual odometer method.

This step may be understood with reference to step 1.1 in the embodiment as shown in FIG. 1. The visual odometer method is a method of calculating the inter-frame geometrical relationship in related art, and may be summarized to extract key points from each image, calculate a matching relationship between the two frames of images, and determine a rotation matrix and a translation distance (scale-free) of the webcam.

In step 6012, a plurality of preset scale factors are discretely set, and an overall reconstruction error corresponding to each preset scale factor, from the second sample image to the first sample image, is determined by combining each preset scale factor with the true-value depth map.

This step may be understood with reference to step 1.2 in the embodiment as shown in FIG. 1, and an overall reconstruction error from the second sample image to the first sample image may be determined through formula (1).

In step 6013, a preset scale factor is determined as a target scale factor based on a plurality of overall reconstruction errors corresponding to a plurality of preset scale factors.

The plurality of the overall reconstruction errors may be obtained by discretely presetting the plurality of scale factors, and the scale factor corresponding to the minimum overall reconstruction error among the plurality of the overall reconstruction errors is taken as the target scale factor.

In step 6014, a scaled inter-sample-frame geometrical relationship corresponding to the sample image pair is determined based on the target scale factor and the scale-free inter-sample-frame geometrical relationship.

This step may be understood with reference to step 1.3 in the embodiment as shown in FIG. 1. The scaled inter-sample-frame geometrical relationship may be obtained by multiplying the target scale factor with the scale-free inter-frame geometrical relationship. The scaled inter-frame geometrical relationship is restored through the scale-free inter-frame geometrical relationship output from the visual odometer and the true-value depth map so as to calculate the reconstruction error of the inter-frame deep feature map in the depth estimation network, and explicit geometrical constraints are added in the depth estimation network, such that the generalization of the trained first neural network is better.

In some optional embodiments, based on the above embodiment, step 602 may include the following steps:

respectively performing feature extraction on the sample image pair by utilizing the feature extraction branch in the first neural network to obtain a first sample feature map corresponding to the first sample image and a second sample feature map corresponding to the second sample image;

determining the predicted inter-frame geometrical relationship between the first sample image and the second sample image through the pose estimation branch;

determining a sample reconstruction error between the first sample feature map and the second sample feature map based on the predicted inter-frame geometrical relationship;

processing the sample reconstruction error with the depth estimation branch to obtain a predicted depth map corresponding to the first sample image.

Optionally, a predicted cost volume from the second sample feature map to the first sample feature map is determined based on the sample reconstruction error; and a predicted depth map corresponding to the first sample image is obtained by processing the predicted cost volume with the depth estimation branch of the first neural network.

The process of performing the feature extraction, prediction on the inter-frame geometrical relationship and prediction on the depth map through the first neural network in the present embodiment is similar with the process of the image depth estimation method provided in the embodiment as shown in FIG. 3 to FIG. 5. The prediction process of the inter-frame geometrical relationship may be understood with reference to step 2.1 and step 2.2 in the embodiment as shown in FIG. 1, and the prediction on the depth map is understood with reference to step 2.4 and step 2.5 in the embodiment as shown in FIG. 1.

Any image depth estimation method or neural network training method provided in the embodiment of the present disclosure may be executed through any proper equipment with data processing capability, which includes, but is not included to: terminal equipment, a server and the like. Alternatively, any image depth estimation method or neural network training method provided in the embodiment of the present disclosure may be executed through a processor, for example, the processor performs any image depth estimation method or neural network training method involved in the embodiment of the present disclosure by calling corresponding instructions stored in a memory. There is no detailed description hereinafter.

Exemplary Device

Figure 8:
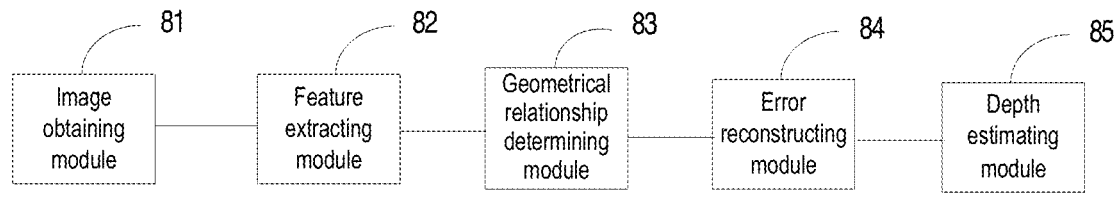
FIG. 8 is a structural schematic diagram of an image depth estimation device provided in an exemplary embodiment of the present disclosure.

FIG. 8 is a structural schematic diagram of an image depth estimation device provided in an exemplary embodiment of the present disclosure. As shown in FIG. 8, the device provided in the present embodiment includes:

an image obtaining module 81 which is configured to obtain a first image frame and a second image frame collected in a movement process of an electronic apparatus;

a feature extracting module 82 which is configured to determine a first feature map corresponding to the first image frame obtained through the image obtaining module 81 and a second feature map corresponding to the second image frame obtained through the image obtaining module 81;

a geometrical relationship determining module 83 which is configured to determine an inter-frame geometrical relationship between the first image frame and the second image frame obtained through the image obtaining module 82;

an error reconstructing module 84 which is configured to determine a reconstruction error between the first feature map and the second feature map based on the inter-frame geometrical relationship determined through the geometrical relationship determining module 83; and a depth estimating module 85 which is configured to determine a depth map corresponding to the first image frame based on the reconstruction error determined through the error reconstructing module 84.

According to the image depth estimation device provided in the embodiment of the present disclosure, the reconstruction error between the first feature map and the second feature map is determined by utilizing the inter-frame geometrical relationship, and explicit geometrical constraints are added for depth estimation, such that the generalization of the depth estimation is improved.

Figure 9:
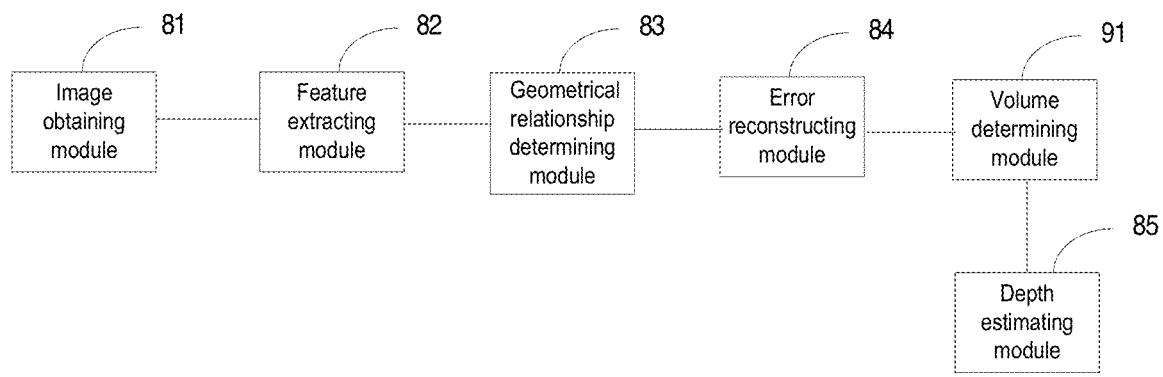
FIG. 9 is a structural schematic diagram of an image depth estimation device provided in another exemplary embodiment of the present disclosure.

FIG. 9 is a structural schematic diagram of an image depth estimation device provided in another exemplary embodiment of the present disclosure. In the present embodiment, the inter-frame geometrical relationship includes a translation distance and a rotation matrix. As shown in FIG. 9, the device provided in the present embodiment includes:

a feature extracting module 82 which is specifically configured to perform feature extraction respectively on the first image frame and the second image frame by utilizing a feature extraction branch in a first neural network to obtain a first feature map and a second feature map; and a geometrical relationship determining module 83 which is specifically configured to perform pose estimation on the first feature map and the second feature map by utilizing a pose estimation branch in the first neural network to obtain a translation distance and a rotation matrix of image collecting equipment between the first image frame and the second image frame.

Optionally, the device provided in the present embodiment further may include an error reconstructing module 84 which is specifically configured to calculate a reconstruction error from the second feature map to the first feature map based on the translation distance and the rotation matrix output from the pose estimation branch.

The device provided in the present embodiment further includes a volume determining module 91 which is configured to determine a cost volume from the second feature map to the first feature map based on the reconstruction error.

Optionally, the device provided in the present embodiment further may include an error reconstructing module 84 which is specifically configured to determine a plurality of groups of pixel pairs, meeting set conditions, in the first feature map and the second feature map based on the translation distance, the rotation matrix and a plurality of preset depth values, wherein each group of the pixel pairs includes a first feature point in the first feature map and a plurality of second feature points in the second feature map; and to determine a reconstruction error between one first feature point and one second feature point in each group of the pixel pairs; and a volume determining module 91 which is specifically configured to determine an error vector corresponding to each pixel pair based on the reconstruction error between one first feature point and one second feature point in each group of the pixel pairs, and determine a cost volume from the second feature map to the first feature map based on the error vectors corresponding to the plurality of groups of the pixel pairs.

Optionally, the device provided in the present embodiment further may include a depth estimating module 85 which is specifically configured to process the cost volume with a depth estimation branch to obtain a depth map corresponding to the first image frame.

Figure 10:
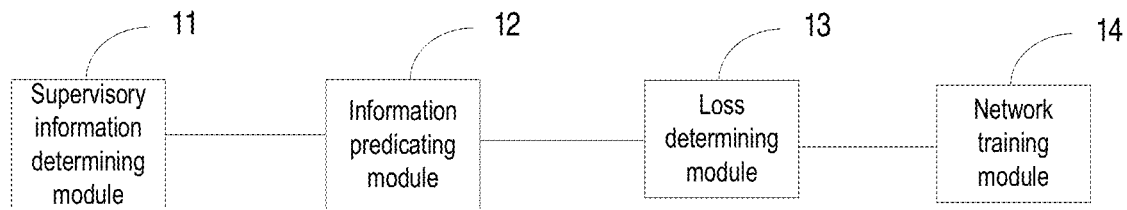
FIG. 10 is a structural schematic diagram of a neural network training device provided in an exemplary embodiment of the present disclosure.

FIG. 10 is a structural schematic diagram of a neural network training device provided in an exemplary embodiment of the present disclosure. As shown in FIG. 10, the device provided in the present embodiment includes:

a supervisory information determining module 11 which is configured to determine a scaled inter-sample-frame geometrical relationship corresponding to a sample image pair in a training set;

wherein the training set includes a plurality of sample image pairs, and each of the sample image pairs includes a first sample image and a second sample image, each of the first sample images corresponding to a true-value depth map;

an information predicting module 12 which is configured to process the sample image pair with a feature extraction branch, a pose estimation branch and a depth estimation branch in a first neural network so as to obtain a predicted inter-frame geometrical relationship and a predicted depth map corresponding to the first sample image;

a loss determining module 13 which is configured to determine first loss based on the predicted inter-frame geometrical relationship determined through the information predicating module 12 and the inter-sample-frame geometrical relationship determined through the supervisory information determining module, and determine second loss based on the predicted depth map determined through the information predicting module and the true-value depth map; and a network training module 14 which is configured to train the first neural network based on the first loss and the second loss determined through the loss determining module 13.

According to the neural network training device provided in the embodiment of the present disclosure, the scaled inter-sample-frame geometrical relationship is added as a supervisory signal to simultaneously realize supervised training on the pose estimation network and the depth estimation network, such that scaled motion information is obtained, and precise positioning of mobile equipment is facilitated. And meanwhile, the problem that geometrical constraint scale is uncertain in depth estimation is solved, such that the generalization of the trained first neural network is better.

Optionally, in the neural network training device provided in another exemplary embodiment of the present disclosure, the information predicting module 12 is specifically configured to perform feature extraction on the sample image pair by utilizing the feature extraction branch of the first neural network to obtain a first sample feature map corresponding to the first sample image and a second sample feature map corresponding to the second sample image, determine a predicted inter-frame geometrical relationship between the first sample image and the second sample image through the pose estimation branch, determine a sample reconstruction error between the first sample feature map and the second sample feature map based on the predicted inter-frame geometrical relationship, and process the sample reconstruction error by utilizing the depth estimation branch to obtain a predicted depth map corresponding to the first sample image.

Optionally, in the neural network training device provided in another exemplary embodiment of the present disclosure, the supervisory information determining module 11 is specifically configured to determine a scale-free inter-sampleframe geometrical relationship between sample image pair by utilizing a visual odometer method; discretely set a plurality of preset scale factors, and determine an overall reconstruction error, corresponding to each preset scale factor, from the second sample image to the first sample image by combining each preset scale factor with a true-value depth map; determine one preset scale factor as a target scale factor based on the plurality of overall reconstruction errors corresponding to the plurality of the preset scale factors; and determine a scaled inter-sample-frame geometrical relationship corresponding to the sample image pair based on the target scale factor and the scale-free inter-sample-frame geometrical relationship.

Optionally, in the neural network training device provided in another exemplary embodiment of the present disclosure, when processing the sample reconstruction error by utilizing the depth estimation branch of the first neural network and obtaining a predicted depth map corresponding to the first sample image, the information predicting module 12 is configured to determine a predicted cost volume from the second sample feature map to the first sample feature map based on the sample reconstruction error, and obtain a predicted depth map corresponding to the first sample image by processing the predicted cost volume with the depth estimation branch of the first neural network.

Exemplary Electronic Equipment

The electronic equipment in the embodiment of the present disclosure is described with reference to FIG. 11 hereinafter. The electronic equipment may be any one or two or independent single-unit equipment of first equipment 100 and second equipment 200, and the single-unit equipment may communicate with the first equipment and the second equipment to receive a collected input signal from the first equipment and the second equipment.

Figure 11:
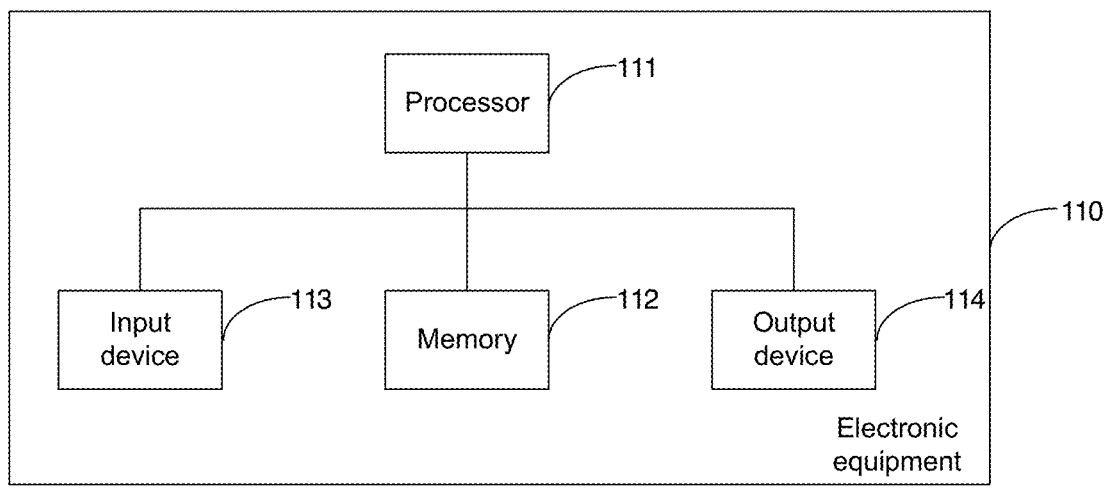
FIG. 11 is a structure diagram of electronic equipment provided in an exemplary embodiment of the present disclosure.

FIG. 11 is a block diagram of electronic equipment provided in an embodiment of the present disclosure.

As shown in FIG. 11, the electronic equipment 110 includes one or more processors 111 and a memory 112.

The processor 111 may be a Central Processing Unit (CPU) or other processing unit with data processing capability and/or instruction executing capability, and may control other components in the electronic equipment 110 to execute expected functions.

The memory 112 may include one or more computer program products which may include computer-readable storage mediums of various forms, for example, a volatile memory and/or a nonvolatile memory. The volatile memory may include a Random Access Memory (RAM) and/or a Cache and the like. The nonvolatile memory may include a Read-only Memory (ROM), a hard disk, a flash memory and the like. One or more computer program instructions may be stored on the computer-readable storage medium, and the processor 111 may run the program instructions to realize the image depth estimation method or the neural network training method and/or other expected functions in each embodiment of the present disclosure. The computer-readable storage medium further may store various contents such as an input signal, a signal component and a noise component.

In an example, the electronic equipment 110 may further include an input device 113 and an output device 114, which are connected with each other through a bus system and/or connecting mechanisms (not shown) of other forms.

For example, when the electronic equipment is the first equipment 100 or the second equipment 200, the input device 113 may be a microphone or a microphone array for acquiring an input signal of a sound source. When the electronic equipment is the single-unit equipment, the input device 113 may be a communication network connector which is configured to receive the collected input signal from the first equipment 100 and the second equipment 200.

In addition, the input equipment 113 may further include a keyboard, a mouse and the like.

The output device 114 may output various information to the outside, including determined distance information, determined direction information and the like. The output equipment 114 may include a display, a loudspeaker, a printer, a communication network, remote output equipment connected to the communication network, and the like.

Of course, for simplicity, only some of the components related to the disclosure in the electronic equipment 110 are shown in FIG. 11, and components such as buses, input/output interfaces, etc. are omitted. In addition, according to specific application conditions, the electronic equipment 110 may also include any other appropriate components.

Exemplary Computer Program Product and Computer-readable Storage Medium

In addition to the above-mentioned method and equipment, the embodiments of the present disclosure may also be a computer program product, which includes computer program instructions that, when run by a processor, cause the processor to execute the steps in the image depth estimation method or the neural network training method according to various embodiments of the disclosure described in the "exemplary method" described above in the present specification.

The computer program product may be computer program codes for performing the operations in the embodiment of the disclosure which may be written in one or more programming languages, or combinations thereof. The programming languages include object-oriented programming languages, such as Java, C++, and conventional procedural programming languages, such as "C" or similar programming languages. The program codes may be executed entirely on the user's computing equipment, partly on the user's equipment, as an independent software package, partly on the user's computing equipment and partly on remote computing equipment, or entirely on remote computing equipment or a server.

In addition, the embodiments of the present disclosure may also be a computer-readable storage medium, which stores computer program instructions that, when run by a processor, cause the processor to execute the steps in the image depth estimation method or the neural network training method according to various embodiments of the present disclosure described in the "exemplary method" described above in the present specification.

The computer-readable storage medium may adopt any combination of one or more readable media. The readable medium may be a readable signal medium or a readable storage medium. The readable storage medium may be, for example, but not limited to, an electronic, magnetic, optical, electromagnetic, infrared, or semiconductor system, device, or apparatus, or any combination thereof. More specific example (non-exhaustive list) of the readable storage medium may include, but are not limited to: electrical connection with one or more wires, a portable disk, a hard disk, a Random Access memory (RAM), a Read-only Memory (ROM), an Erasable Programmable Read-only Memory (EPROM or flash memory), an optical fiber, a portable Compact Disk Read-only Memory (CD-ROM), an optical storage apparatus, a magnetic storage apparatus, or any suitable combination thereof.

The basic principles of the present disclosure are described above in conjunction with specific embodiments. However, it should be pointed out that the features, advantages, effects, etc. mentioned in the present disclosure are exemplary only and not limiting, and these features, advantages, effects, etc. cannot be considered to be necessary for each embodiment of the disclosure. In addition, the specific details of the disclosure are only for illustrative purposes and easy-to-understand purposes, rather than limitations, and do not limit the present disclosure to the specific details for implementation.

Each of the embodiments in the specification is described in a progressive manner, and each embodiment focuses on the differences from other embodiments, and the same or similar parts among the various embodiments may be referred to one another. For the embodiment of the system, it is basically similar with the embodiment of method, so the description is simpler, and the related parts may be referred to the description of the embodiment of method.

The block diagrams of the apparatuses, devices, equipment, and systems involved in the present disclosure are merely illustrative examples and are not intended to require or imply that they must be connected, arranged, and configured in the manner shown in the block diagrams. Those skilled in the art will recognize that these apparatuses, devices, equipment, and systems may be connected, arranged, and configured in any manner. Words such as "including", "containing", "having", etc. are open vocabulary and mean "including but not limited to" and may be used interchangeably. The terms "or" and "and" as used herein refer to the terms "and/or" and may be used interchangeably, unless otherwise not explicitly indicated from the context. The word "such as" used herein refers to the phrase "such as but not limited to" and may be used interchangeably.

The method and device of the present disclosure may be implemented in many ways. For example, the method and device of the present disclosure may be implemented by software, hardware, firmware or any combination thereof. The above-mentioned order of the steps for the method is only for illustration, and the steps of the method of the disclosure are not limited to the order specifically described above, unless otherwise specified in other ways. In addition, in some embodiments, the present disclosure may also be implemented as programs recorded in a recording medium, and these programs include machine-readable instructions for implementing the method according to the present disclosure. Thus, the present disclosure also covers a recording medium storing a program for executing the method according to the present disclosure.

It should also be pointed out that in the device, equipment and method of the present disclosure, each component or each step may be decomposed and/or recombined. The decomposition and/or recombination should be regarded as an equivalent solution of the disclosure.

The above description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein, but is to be accorded the widest scope consistent with the principles and novel features disclosed herein.

The above description has been given for the purposes of illustration and description. In addition, the description is not intended to limit the embodiments of the present disclosure to the form disclosed herein. Although a number of example aspects and embodiments have been discussed above, those skilled in the art will recognize certain variations, modifications, changes, additions, and sub-combinations thereof.

The invention claimed is:

1. An image depth estimation method, including:
   obtaining a first image frame and a second image frame collected in a movement process of an electronic apparatus;
   determining a first feature map corresponding to the first image frame and a second feature map corresponding to the second image frame;
   determining a scaled inter-frame geometrical relationship between the first image frame and the second image frame;
   determining a reconstruction error between the first feature map and the second feature map based on the inter-frame geometrical relationship; and
   determining a depth map corresponding to the first image frame based on the reconstruction error,
   wherein the inter-frame geometrical relationship includes a translation distance and a rotation matrix;
   wherein the determining a first feature map corresponding to the first image frame and a second feature map corresponding to the second image frame includes respectively performing feature extraction on the first image frame and the second image frame by utilizing a feature extraction branch in a first neural network to obtain the first feature map and the second feature map;
   wherein the determining a scaled inter-frame geometrical relationship between the first image frame and the second image frame includes performing pose estimation on the first feature map and the second feature map by utilizing a pose estimation branch in the first neural network to obtain a translation distance and a rotation matrix of image collecting equipment between the first image frame and the second image frame,
   wherein the determining a reconstruction error between the first feature map and the second feature map based on the inter-frame geometrical relationship includes calculating the reconstruction error from the second feature map to the first feature map based on the translation distance and the rotation matrix output by the pose estimation branch; and
   the method further includes determining a cost volume from the second feature map to the first feature map based on the reconstruction error.

2. The method according to claim 1, wherein the calculating the reconstruction error from the second feature map to the first feature map based on the translation distance and the rotation matrix output by the pose estimation branch, includes:
   determining a plurality of groups of pixel pairs, meeting set conditions, in the first feature map and the second feature map based on the translation distance, the rotation matrix and a plurality of preset depth values, wherein each group of the pixel pairs includes a first feature point in the first feature map and a plurality of second feature points in the second feature map, and
   determining a reconstruction error between one first feature point and one second feature point in each group of the pixel pairs.

3. The method according to claim 2, wherein the determining a cost volume from the second feature map to the first feature map based on the reconstruction error, includes:

by discretely presetting a plurality of different depth values, generating the reconstruction error, and then generating the cost volume base on a following formula:

$$F_{err} = |F_t(p_t) - F_s(p_s)|$$

where $p_t$ and $p_s$ are respectively feature point pairs, meeting a corresponding relationship as shown in a following formula, in the first feature map $F_t$ and the second feature map $F_s$:

$$p_s : KT^*_{t \to s} d_t K^{-1} p_t, \ d_t = \Delta d, 2\Delta d, \ldots, N_2 \Delta d$$

where K is an internal parameter, corresponding to a feature resolution, of the electronic apparatus, $T_{t \to s}$, is a scaled transformation matrix between two frames output from the pose estimation branch, $d_t$ is an assumed depth value at a pixel $p_t$, $\Delta d$ is a depth value interval self-defined by a user based on precision needs, and $N_2$ is a total number of values of the $d_t$;

traversing the values of the $d_t$ to obtain an error vector form by the $F_{err}$; and forming a four-dimensional matrix as the cost volume by the error vectors of all feature points as a cost volume.

4. The method according to claim 2, wherein the determining a cost volume from the second feature map to the first feature map based on the reconstruction error, includes:

determining an error vector corresponding to each pixel pair based on the reconstruction error between one first feature point and one second feature point in each group of pixel pairs, and determining the cost volume from the second feature map to the first feature map is determined based on the error vectors corresponding to the plurality of groups of the pixel pairs.

5. The method according to claim 1, wherein the first image frame and the second image frame are two consecutive frames of images collected through the electronic apparatus.

6. A neural network training method, including:

determining a scaled inter-sample-frame geometrical relationship corresponding to a sample image pair in a training set, wherein the training set includes a plurality of sample image pairs, and each of the sample image pairs includes a first sample image and a second sample image, each of the first sample images corresponding to a true-value depth map;

processing the sample image pairs with a feature extraction branch, a pose estimation branch and a depth estimation branch in a first neural network so as to obtain a predicted inter-frame geometrical relationship and a predicted depth map corresponding to the first sample image;

determining first loss based on the predicted inter-frame geometrical relationship and the inter-sample-frame geometrical relationship, and determining second loss based on the predicted depth map and the true-value depth map; and training the first neural network based on the first loss and the second loss.

7. The method according to claim 6, wherein the determining a scaled inter-sample-frame geometrical relationship corresponding to a sample image pair in a training set includes:

determining a scale-free inter-sample-frame geometrical relationship between the sample image pair through a visual odometer method;

discretely setting a plurality of preset scale factors, and determining an overall reconstruction error, corresponding to each preset factor, from the second sample image to the first sample image by combining each preset scale factor with the true-value depth map;

determining one of the preset scale factors as a target scale factor based on a plurality of overall reconstruction errors corresponding to the plurality of preset scale factors; and determining a scaled inter-sample-frame geometrical relationship corresponding to the sample image pair based on the target scale factor and the scale-free inter-sample-frame geometrical relationship.

8. The method according to claim 7, wherein the determining one of the preset scale factors as a target scale factor based on a plurality of overall reconstruction errors corresponding to the plurality of preset scale factors, includes:

obtaining the plurality of the overall reconstruction errors by discretely presetting the plurality of scale factors, and taking the scale factor corresponding to the minimum overall reconstruction error among the plurality of the overall reconstruction errors as the target scale factor.

9. The method according to claim 6, wherein the processing the sample image pairs with a feature extraction branch, a pose estimation branch and a depth estimation branch in a first neural network so as to obtain a predicted inter-frame geometrical relationship and a predicted depth map corresponding to the first sample image includes:

performing feature extraction on the sample image pair by utilizing the feature extraction branch in the first neural network to obtain a first sample feature map corresponding to the first sample image and a second sample feature map corresponding to the second sample image;

determining a predicted inter-frame geometrical relationship between the first sample image and the second sample image through the pose estimation branch;

determining a sample reconstruction error between the first sample feature map and the second sample feature map based on the predicted inter-frame geometrical relationship; and processing the sample reconstruction error with the depth estimation branch to obtain a predicted depth map corresponding to the first sample image.

10. The method according to claim 6, wherein the processing the sample image pairs with a feature extraction branch, a pose estimation branch and a depth estimation branch in a first neural network so as to obtain a predicted inter-frame geometrical relationship and a predicted depth map corresponding to the first sample image includes:

determining a predicted cost volume from the second sample feature map to the first sample feature map based on the sample reconstruction error; and obtaining a predicted depth map corresponding to the first sample image by processing the predicted cost volume with the depth estimation branch of the first neural network.

11. The method according to claim 6, wherein the training the (Original) first neural network based on the first loss and the second loss includes:

determining comprehensive loss based on the first loss
and the second loss;
determining a gradient of the first neural network based
on the comprehensive loss, and
updating network parameters in the first neural network
through gradient back propagation, to realize the training of the first neural network.

12. Electronic equipment, including:
a processor; and
a memory which is configured to store instructions executable by the processor,
wherein the processor is configured to read the executable instructions from the memory and execute the instructions to implement an image depth estimation method or a neural network training method, wherein the image depth estimation method includes:
obtaining a first image frame and a second image frame collected in a movement process of an electronic apparatus;
determining a first feature map corresponding to the first image frame and a second feature map corresponding to the second image frame;
determining a scaled inter-frame geometrical relationship between the first image frame and the second image frame;
determining a reconstruction error between the first feature map and the second feature map based on the inter-frame geometrical relationship; and
determining a depth map corresponding to the first image frame based on the reconstruction error,
wherein the inter-frame geometrical relationship includes a translation distance and a rotation matrix;
wherein the determining a first feature map corresponding to the first image frame and a second feature map corresponding to the second image frame includes respectively performing feature extraction on the first image frame and the second image frame by utilizing a feature extraction branch in a first neural network to obtain the first feature map and the second feature map;
wherein the determining a scaled inter-frame geometrical relationship between the first image frame and the second image frame includes performing pose estimation on the first feature map and the second feature map by utilizing a pose estimation branch in the first neural network to obtain a translation distance and a rotation matrix of image collecting equipment between the first image frame and the second image frame,
wherein the determining a reconstruction error between the first feature map and the second feature map based on the inter-frame geometrical relationship includes calculating the reconstruction error from the second feature map to the first feature map based on the translation distance and the rotation matrix output by the pose estimation branch; and
the method further includes determining a cost volume from the second feature map to the first feature map based on the reconstruction error.

13. The electronic equipment according to claim 12, wherein the calculating the reconstruction error from the second feature map to the first feature map based on the translation distance and the rotation matrix output by the pose estimation branch, includes:
determining a plurality of groups of pixel pairs, meeting set conditions, in the first feature map and the second feature map based on the translation distance, the rotation matrix and a plurality of preset depth values, wherein each group of the pixel pairs includes a first feature point in the first feature map and a plurality of second feature points in the second feature map, and
determining a reconstruction error between one first feature point and one second feature point in each group of the pixel pairs.

14. The electronic equipment according to claim 12, wherein the neural network training method includes:
determining a scaled inter-sample-frame geometrical relationship corresponding to a sample image pair in a training set, wherein the training set includes a plurality of sample image pairs, and each of the sample image pairs includes a first sample image and a second sample image, each of the first sample images corresponding to a true-value depth map;
processing the sample image pairs with a feature extraction branch, a pose estimation branch and a depth estimation branch in a first neural network so as to obtain a predicted inter-frame geometrical relationship and a predicted depth map corresponding to the first sample image;
determining first loss based on the predicted inter-frame geometrical relationship and the inter-sample-frame geometrical relationship, and determining second loss based on the predicted depth map and the true-value depth map; and
training the first neural network based on the first loss and the second loss.

15. The electronic equipment according to claim 14, wherein the determining a scaled inter-sample-frame geometrical relationship corresponding to a sample image pair in a training set includes:
determining a scale-free inter-sample-frame geometrical relationship between the sample image pair through a visual odometer method;
discretely setting a plurality of preset scale factors, and determining an overall reconstruction error, corresponding to each preset factor, from the second sample image to the first sample image by combining each preset scale factor with the true-value depth map;
determining one of the preset scale factors as a target scale factor based on a plurality of overall reconstruction errors corresponding to the plurality of preset scale factors; and
determining a scaled inter-sample-frame geometrical relationship corresponding to the sample image pair based on the target scale factor and the scale-free inter-sample-frame geometrical relationship.

16. The electronic equipment according to claim 14, wherein the processing the sample image pairs with a feature extraction branch, a pose estimation branch and a depth estimation branch in a first neural network so as to obtain a predicted inter-frame geometrical relationship and a predicted depth map corresponding to the first sample image includes:
performing feature extraction on the sample image pair by utilizing the feature extraction branch in the first neural network to obtain a first sample feature map corresponding to the first sample image and a second sample feature map corresponding to the second sample image;
determining a predicted inter-frame geometrical relationship between the first sample image and the second sample image through the pose estimation branch;
determining a sample reconstruction error between the first sample feature map and the second sample feature map based on the predicted inter-frame geometrical relationship; and processing the sample reconstruction error with the depth estimation branch to obtain a predicted depth map corresponding to the first sample image.

\* \* \* \* \*